(12) United States Patent
Olmstead (10) Patent No.: US 8,622,302 B2
(45) Date of Patent: Jan. 7, 2014

(54) SYSTEMS AND METHODS FOR COMPENSATING FOR FIXED PATTERN NOISE

(75) Inventor: Bryan L. Olmstead, Eugene, OR (US)

(73) Assignee: Datalogic ADC, Inc., Eugene, OR (US)

( * ) Notice: Subject to any disclaimer, the term of this patent is extended or adjusted under 35 U.S.C. 154(b) by 339 days.

(21) Appl. No.: 12/725,912

(22) Filed: Mar. 17, 2010

(65) Prior Publication Data
US 2010/0237149 A1 Sep. 23, 2010

Related U.S. Application Data (60) Provisional application No. 61/161,005, filed on Mar. 17, 2009.

(51) Int. Cl.
*G06K 19/00* (2006.01)

(52) U.S. Cl.
USPC ....... 235/462.01; 235/435; 235/439; 235/451

(58) Field of Classification Search
USPC .................................. 235/435, 439, 454, 462
See application file for complete search history.

(56) References Cited

U.S. PATENT DOCUMENTS

| | | | |
|---|---|---|---|
| 3,568,151 A | 3/1971 | Majima | |
| 3,747,066 A | 7/1973 | Vernot et al. | |
| 3,900,832 A | 8/1975 | Hanchett | |
| 3,986,000 A | 10/1976 | McJohnson | |
| 4,000,397 A | 12/1976 | Hebert et al. | |
| 5,350,908 A | 9/1994 | Bechtel | |
| 5,637,853 A | 6/1997 | Joseph | |
| 5,729,288 A | 3/1998 | Saito | |
| 6,042,012 A | 3/2000 | Olmstead et al. | |
| 6,061,092 A | 5/2000 | Bakhle et al. | |
| 6,271,785 B1 | 8/2001 | Martin et al. | |
| 6,871,785 B2 | 3/2005 | Piva et al. | |
| 7,110,465 B2 | 9/2006 | Kaku et al. | |
| 7,280,141 B1 * | 10/2007 | Frank et al. | 348/243 |
| 7,443,431 B2 | 10/2008 | Kelly et al. | |
| 2002/0064234 A1 | 5/2002 | Kaku et al. | |

(Continued)

FOREIGN PATENT DOCUMENTS

WO WO 2005/106768 11/2005

OTHER PUBLICATIONS

Shawn Barnett and Dave Etchells; Canon EOS 30D; http://www.imaging-resource.com/PRODS/E30D/E30DA7.HTM; Apr. 14, 2006.

(Continued)

*Primary Examiner* — Michael G Lee
*Assistant Examiner* — Matthew Mikels
(74) *Attorney, Agent, or Firm* — Stoel Rives LLP (57) ABSTRACT

This disclosure relates generally to systems and methods for estimating and, at least partially, compensating for fixed pattern noise (FPN) in an image sensor. In one configuration, an estimate of the FPN of an image sensor may be obtained by capturing a dark image (either a linear or an area image, depending on the sensor type) using a first exposure time, an illuminated image may be captured using a second exposure time, the second exposure time is greater than the first exposure time, and the dark image may be subtracted from the illuminated image to compensate, at least partially, for FPN. Certain configurations may utilize virtual scan lines. Two or more dark images may also be utilized to estimate FPN in an image sensor.

21 Claims, 5 Drawing Sheets

(56) References Cited

U.S. PATENT DOCUMENTS

| | | |
|---|---|---|
| 2005/0134714 A1 | 6/2005 | Carlson et al. |
| 2006/0180670 A1* | 8/2006 | Acosta et al. ............ 235/462.31 |
| 2006/0256890 A1 | 11/2006 | Kaku et al. |
| 2007/0222870 A1* | 9/2007 | Itoh .............................. 348/243 |
| 2008/0062161 A1* | 3/2008 | Brown et al. ................. 345/207 |
| 2008/0100736 A1 | 5/2008 | Ise |
| 2008/0298649 A1* | 12/2008 | Ennis et al. ................... 382/125 |
| 2009/0059316 A1* | 3/2009 | Irwin et al. .................... 358/474 |
| 2009/0101798 A1 | 4/2009 | Yadid-Pacht et al. |

OTHER PUBLICATIONS

Chris Limone; Dark Frame Subtraction Using Adobe Photoshop, http://takegreatpictures.com/digital%20photography/9503; Dec. 23, 2008.

* cited by examiner

FIG. 5

SYSTEMS AND METHODS FOR COMPENSATING FOR FIXED PATTERN NOISE

COPYRIGHT NOTICE

© 2008 Datalogic Scanning, Inc. A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR §1.71(d).

TECHNICAL FIELD

The field of the present disclosure relates generally, but not exclusively, to optical data readers and, in a preferred application, to systems and methods for reducing fixed pattern noise in optical data readers.

BACKGROUND

Optical reading of data or encoded symbols, such as barcode labels, has been used in many applications. Typically, a barcode consists of a series of parallel light and dark rectangle areas of varying widths. Different widths of bars and spaces define different characters in a particular barcode symbology. A barcode label may be read by an optical code reader, which detects reflected and/or refracted light from the bars and spaces comprising the characters. A detector generates an electrical signal that has an amplitude determined by the intensity of the collected light. It should be understood that the principles described herein are applicable to various systems and methods for reading many types of optical codes, including 1-D, 2-D, Maxicode, PDF-417, and others.

An optical code reader may utilize solid state image circuitry, such as charge coupled devices (CCDs) and complementary metal oxide semiconductor (CMOS) imagers to read an optical code. An optical code to be read may be illuminated with a light source, and reflected light may be collected by the CCD or CMOS imager. An electrical signal may be generated having an amplitude determined by the intensity of the collected light. As the image is read out, positive and negative transitions in the signal occur, signifying transitions between the bars and spaces.

Optical code readers may be implemented using either a one-dimensional (a linear imager) or two-dimensional imaging array (an area sensor) of photosensors (or pixels) to capture the optical code. One-dimensional CCD readers capture a linear cross section of the optical code and may produce an analog waveform whose amplitude represents the relative darkness and lightness of the optical code. Two-dimensional CCD or CMOS imagers capture a two-dimensional image.

Various factors influence the performance of optical code readers, including noise in the signal. CCDs and CMOS imagers may exhibit noise from a variety of sources, including fixed pattern noise (FPN).

The present inventor has recognized that advantages may be realized by removing or reducing FPN in an optical code reader during normal operation. Such advantages may include improved performance in low light conditions, faster exposure times, and allowing the use of less expensive components. The present inventor has therefore determined that it would be desirable to remove or reduce FPN in an optical code reader so as to realize these and other advantages.

SUMMARY

Disclosed are systems and methods for estimating and, at least partially, compensating for fixed pattern noise (FPN) in an image sensor of an optical data reader. In one configuration, an estimate of the FPN of an image sensor may be obtained by capturing a dark image (either a linear or an area image, depending on the sensor type) using a first exposure time. An illuminated image may be captured using a second exposure time. The second exposure time is greater than the first exposure time. The dark image may be subtracted from the illuminated image to compensate, at least partially, for FPN.

In another preferred example, virtual scan lines may be utilized. A dark virtual scan line is generated from a dark two dimensional image. Similarly, an illuminated virtual scan line is generated from an illuminated two dimensional image. The dark virtual scan line may then be subtracted from the illuminated virtual scan line to compensate, at least partially, for FPN.

In yet another example, two or more dark images may be captured and used to estimate FPN in an image sensor. The two or more dark images may be used to estimate different components of FPN, including dark current variations and transistor threshold mismatch. The estimated components of FPN may then be subtracted from an illuminated image to compensate, at least partially, for FPN.

BRIEF DESCRIPTION OF THE DRAWINGS

Understanding that drawings depict only certain preferred embodiments and are not therefore to be considered to be limiting in nature, the preferred embodiments will be described and explained with additional specificity and detail through the use of the accompanying drawings, in which.

DETAILED DESCRIPTION OF PREFERRED EMBODIMENTS

In the following description, numerous specific details are provided for a thorough understanding of specific preferred embodiments. However, those skilled in the art will recognize that embodiments can be practiced without one or more of the specific details, or with other methods, components, materials, etc., following the descriptions herein.

In some cases, well-known structures, materials, or operations are not shown or described in detail in order to avoid obscuring aspects of the preferred embodiments. Furthermore, the described features, structures, or characteristics may be combined in any suitable manner in one or more embodiments.

FPN may include dark FPN, also known as dark signal non-uniformity (DSNU), and pixel response non-uniformity (PRNU). DSNU may include two different types of noise, namely threshold mismatch DSNU and dark current DSNU. Threshold mismatch DSNU may be caused by offset differences between pixels in a CMOS or CCD imager. The offset differences may be attributable to manufacturing process-related threshold voltage variations in the readout transistors coupled to each pixel. The output stage in some CMOS or CCD imagers consists of a single transistor in an open-loop source-follower configuration, leading to threshold mismatch DSNU.

DSNU in CCD or CMOS imagers may also be caused by manufacturing process-related variations in dark current DSNU between neighboring pixels. Dark current is a relatively small electric current that flows through a photosensitive device, including photodiodes and/or charge-coupled devices, even when no photons are entering the device. Pixel response non-uniformity (PRNU) may also introduce FPN into the signal. PRNU refers to gain variations between pixels in response to a uniformly illuminated image. Such variations may be attributable, at least in part, to sensitivity variations of the photodiode and to differences in photodiode area between pixels.

FPN may be a significant noise source, especially in low light conditions (e.g., less than 100 lux). For example, a model RPLIS-2048 linear CMOS imager, Rev H, available from Panavision Imaging, LLC, Homer, N.Y., has (according to its data sheet) FPN of 5% peak-to-peak full scale, or approximately 110 mV when peak-to-peak voltage is 2.2 V. The random noise cited in the data sheet for this same part is 1 mV rms (or about 5 mV peak-to-peak). In this example, the DSNU is 22 times larger than the random noise floor. Accordingly, by removing or correcting the FPN, a significant improvement in the signal to noise ratio could be achieved.

The effects of FPN may be reduced by various techniques, such as increasing the level of illumination, increasing the exposure time, or selecting components with low FPN. Increasing the level of illumination may result in an increased signal strength and an improved signal-to-noise ratio; however, high intensity illumination may not always be available or convenient for a user. Longer exposure times may also reduce FPN in a given signal; however, longer exposure times may introduce other noise sources into the system and may reduce the performance of an imaging system (such as reducing the tolerance of the imaging system to object motion). Finally, components may be selected that are less prone to noise; however, such components may be more expensive and may increase the cost of the system.

Other techniques for compensating for FPN may include calibration in non-operating conditions to obtain estimates of FPN for a given exposure time and temperature. Such calibration, however, may require a system to retain a variety of estimates of FPN, thus requiring additional resources. Further, since FPN may be unique to an individual CCD or CMOS imager, individual calibration of each CCD or CMOS imager may be required. Calibration of each individual CCD or CMOS imager would be costly and time consuming.

As described above, FPN may include at least three types of noise: (1) DSNU due to transistor threshold mismatch, (2) DSNU due to dark current variation, and (3) PRNU. Noise from dark current DSNU may vary according to temperature and exposure time, with longer exposure times and/or higher temperatures resulting in greater noise from dark current DSNU. Further, low light conditions (e.g., less than 100 lux) may cause dark current DSNU to be a significant noise source. Certain embodiments disclosed herein compensate, at least partially, for dark current DSNU in an image sensor of an optical data reader. In certain applications, however, one or more sources of noise may not have a significant impact on the application. For example, it may be determined that when an exposure time is less than a particular threshold (e.g., less than 500 microseconds), the dark current DSNU component of FPN is small enough that it may be ignored.

Similarly, it may be determined that the impact of PRNU on a particular application is tolerable when subtle differences in pixel gain do not adversely affect the performance of an imager. For example, when an optical code is imaged by an optical code reader, the image is analyzed for the stark contrast between bars and spaces (typically black bars and white spaces). In such an application, the high contrast between the black bars and the white background makes the impact of PRNU in the signal less important.

In certain applications and with certain CMOS imagers, FPN may be approximated as simply DSNU due to transistor threshold mismatch because dark current DSNU and PRNU are either negligible or are unimportant for the particular application. An estimate of threshold mismatch may be acquired using a single dark exposure having a short exposure time because threshold mismatch is relatively unaffected by exposure time. Further, since the exposure time is short, the dark image will contain only negligible scene information, and thus, the same dark image may be subtracted from a plurality of illuminated images in order to compensate for FPN. This process is preferably done during normal operation of the system because the threshold voltage varies with temperature. The illuminated images and dark images will have the same threshold voltage DSNU characteristics if captured within a reasonable time frame, since the temperature would not vary significantly between measurements.

Figure 1:
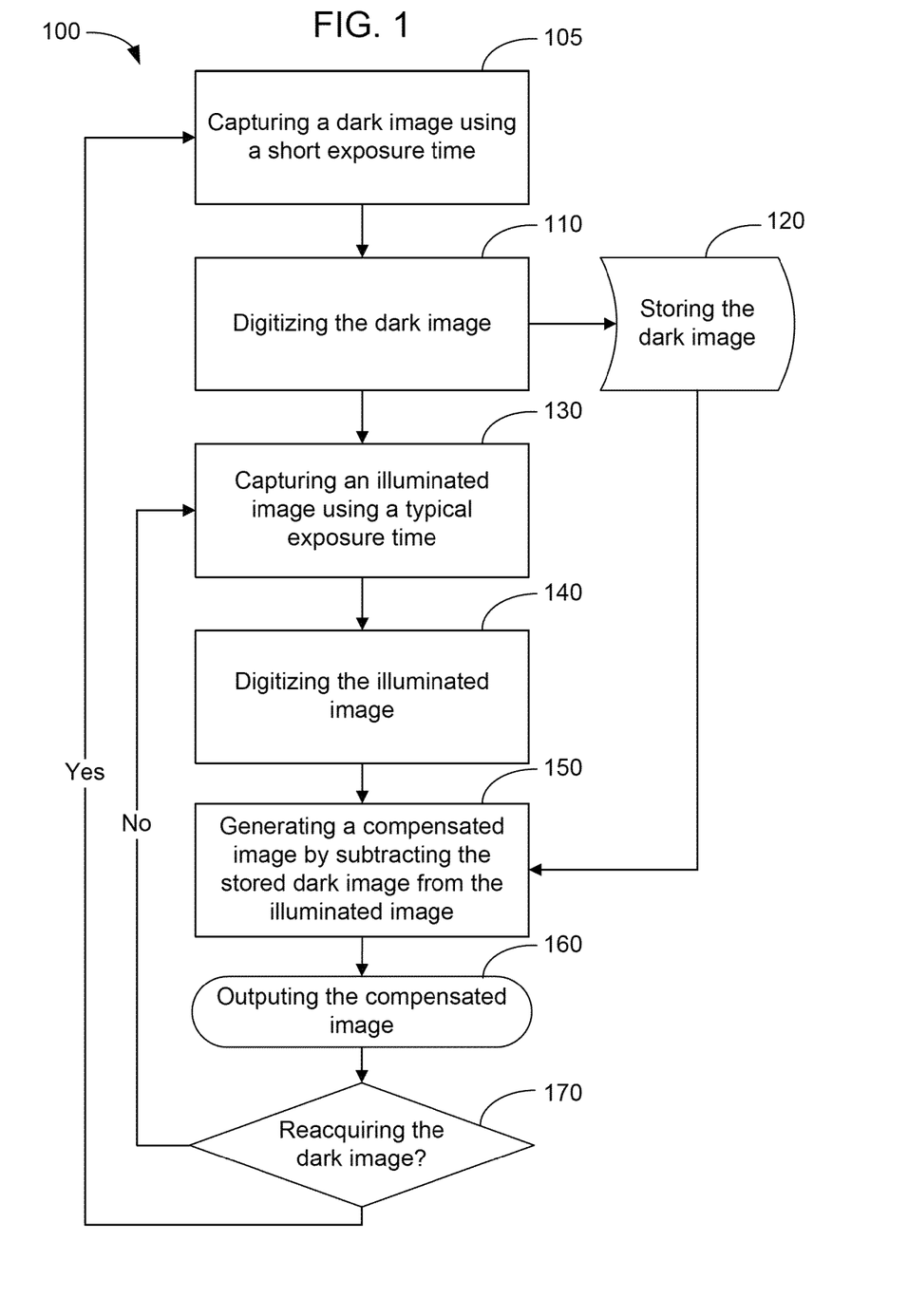
FIG. 1 is a flow chart of a method for compensating for FPN in an image sensor, according to a preferred embodiment.

FIG. 1 illustrates an exemplary method 100 for compensating for FPN. In the method 100, FPN is approximated using a single dark image. Alternatively, several dark images could be captured and averaged in order to make a more accurate measurement of FPN, if the readout noise of the system is not negligible compared to the magnitude of the FPN. By averaging several dark images, the effect of readout noise is reduced, since the readout noise is uncorrelated between the images. By averaging a suitable number of dark images, the effect of readout noise on measurement of FPN can also be reduced. At step 105, a dark image is captured using a short exposure time. The captured image may be referred to as "dark" because the period of the exposure may be brief. In this brief exposure period the number of photons striking the image sensor will be low. Accordingly, the resulting dark image will contain only negligible scene information, but may provide an estimate of the threshold mismatch of the image sensor according to the then existing conditions. Assuming that dark current DSNU and PRNU are negligible, a dark image may be captured, stored, and subtracted from one, or a plurality of illuminated images, each of which may have a different exposure time, in order to compensate for FPN.

A dark image has an exposure time that is short (i.e., the influence of the illumination of the scene is negligible). For example, if an exposure time is T seconds, an exposure of T/256 seconds would have 1/256 of the scene intensity. In such a system, any error attributable to scene information would be less than 1 bit in an 8 bit system. A suitable exposure time for a dark image may vary depending on the imager and the conditions of operation. A preferred range of an exposure time for a dark image is between approximately 1 microsecond and 1,000 microseconds. In an alternate embodiment, the range is between 5 and 30 microseconds. Such a range may effectively capture an estimate of FPN while minimizing the amount of scene information contained in the dark image. The optical reading systems and methods of the preferred embodiments are not limited to the preferred range, and exposure times less than 1 microsecond or more than 1,000 microseconds may also be used.

At step 110, the dark image is digitized, and at step 120 the digitized image is stored. The digitization may be accomplished using a microprocessor (such as a DSP) and an analog-to-digital converter (ADC) or any other suitable processing system. At step 120, the digitized dark image is stored in a computer-readable storage medium. The computer-readable storage medium may be embodied as RAM, a hard disk drive, flash memory, or other suitable type of digital storage device. Similarly, at step 140, an illuminated image is digitized, and in certain embodiments the illuminated image may be stored in the computer-readable storage medium.

At step 130, an illuminated image is captured using a typical exposure time. An illuminated image, as the term is used herein, is the result of an exposure time based on the conditions that are likely to allow the optical code reader to obtain a suitable image of the desired scene information. Illumination may be from ambient light, or from self generated light, such as from LEDs, or a combination thereof. In certain embodiments, an illuminated exposure time may be a constant value, while in other embodiments, the exposure time may be based on measurements of the ambient light or measurements of the returned signal. Various exposure control systems may be utilized to realize a suitable range of exposure times.

In one preferred embodiment, the exposure time of the illuminated image is between 100 and 1,000 times longer than the exposure time of the dark image. In an alternate embodiment, the exposure time of the illuminated image is between 200 and 300 times longer than the exposure time of the dark image. In still a more preferred embodiment, the exposure time of the illuminated image is approximately 256 times longer than the exposure time of the dark image. Exposure times less than 100 times or more than 1,000 times longer than the exposure time of the dark image may also be used. For example, certain embodiments may be configured for short illuminated exposure times, and accordingly, may have an illuminated exposure time of only 50 times longer than the exposure time of the dark image.

The illuminated image includes both desired data about the optical code (e.g., scene information) to be read and FPN that is approximated by the dark image stored at step 120. Accordingly, at step 150, a compensated image is generated by subtracting the stored dark image from the illuminated image. At step 160, the compensated image may be outputted for further processing, such as edge detection and reading of the optical code.

An updated dark image may be acquired periodically during use, or may be captured as required by conditions, such as changes in temperature. Various components may be included in the optical code reader to determine when reacquisition of the dark image is required. Since dark current DSNU is influenced by temperature, in one embodiment the optical code reader may periodically determine the temperature, and when a change in temperature is detected, the dark image may be reacquired. From step 170 the process returns to step 105, if the dark image is to be reacquired. If the dark image does not need to be reacquired, the process returns to step 130.

The method 100 may be implemented in an optical code reader such that a dark image may be acquired during normal operation of the optical code reader. In other words, special equipment (e.g., a calibration box) and special conditions (e.g., particular lighting conditions and particular temperatures) are not required in order to obtain an estimate of FPN using a dark image. For example, in certain embodiments using a trigger pull scanner, a new dark image may be obtained each time the trigger is pulled. In various embodiments, the system may capture a dark image each time the system is activated, or may recapture a dark image according to an established schedule or as environmental conditions require. Further, the method 100 may be implemented such that an optical code reader compensates for FPN during normal operation. For example, in certain embodiments using a trigger pull scanner, method 100 may be performed each time the trigger is pulled. Method 100 is applicable, in various embodiments, to compensate for fixed pattern noise in both linear and two dimensional imagers.

In one embodiment, a microprocessor implements the method 100, as illustrated in FIG. 1, using a linear imager and the following pseudocode description of the method. The following pseudocode is copyright 2008 Datalogic Scanning, Inc.:

1. Capture a dark linear image using exposure time T1.

2. Digitize and store pixels from dark linear image into array D(i)=ADC(i), where i=0 to number of pixels in linear array, and ADC(i) is the digitized result from an analog to digital converter of pixel i.

3. Capture an illuminated linear image using exposure time T2.

4. Digitize and store a fixed pattern noise compensated image C(i)=ADC(i)−D(i), where ADC(i) is the digitized illuminated linear image and D(i) is the stored dark linear image.

Code for one embodiment of the method 100 of FIG. 1 adapted for use on the Analog Devices model DSP2802 processor is set forth below. If the variable bGotDark is false, it is assumed that the data being captured was from a dark linear image, and the input data is captured into the array pInputPixels. If the variable bGotDark is true, then it is assumed that the dark image was captured and the illuminated image is captured. Accordingly, the dark image is subtracted from the illuminated image. The subtraction occurs at lines 17-22. The output array is an 8 bit data type, while the input data is 16 bits. The following code is copyright 2008 Datalogic Scanning, Inc.:

```
01  /*
02   * ======== hwi_adc_task ========
03   * adc hardware interrupt (int1)
04   * this interrupt is triggered by an adc sequence
05   * copy the adc register into the pixel buffer
06   *
07   */
08  interrupt void hwi_adc(void)
09  {
10      Uint16 nVal = AdcRegs.ADCRESULT0;
11
12      // Data is converted from 16 bit data type to 8 bit data type
```

```
13
14      // if we have darkPixels then subtract dark from current adcreg
15      if(bGotDark)
16      {
17          if (bHi)
18              pInputPixels[*pNdxInput] = (nVal - darkPixels[*pNdxInput*2]) << 8;
19          else
20              pInputPixels[*pNdxInput++] |= (nVal - darkPixels[*pNdxInput*2]) & 0xff;
21
22          bHi = !bHi;
23      }
24      else
25          pInputPixels[*pNdxInput++] = nVal; // 16bit valued dark pixels
26
27      // if pixel buffer is full then turn off interrupt
28      if ((bGotDark && (*pNdxInput >= BUFFSIZE/2)) || (!bGotDark && (*pNdxInput >= BUFFSIZE)))
29      {
30          EPwm1 Regs.ETSEL.bit.SOCAEN = 0x0; // disable soca
31          AdcRegs.ADCTRL2.bit.INT_ENA_SEQ1 = 0x0; // disable hwi(int1)
32          bFrameDone = 1;
33      }
34
35      // Reinitialize for next ADC sequence
36      AdcRegs.ADCTRL2.bit.RST SEQ1 = 1;   // Reset SEQ1
37      AdcRegs.ADCST.bit.INT_SEQ1_CLR = 1;  // Clear INT SEQ1 bit
38      PieCtrlRegs.PIEACK.all = PIEACK_GROUP1; //Acknowledge interrupt to PIE
39  }
```

Figure 2:
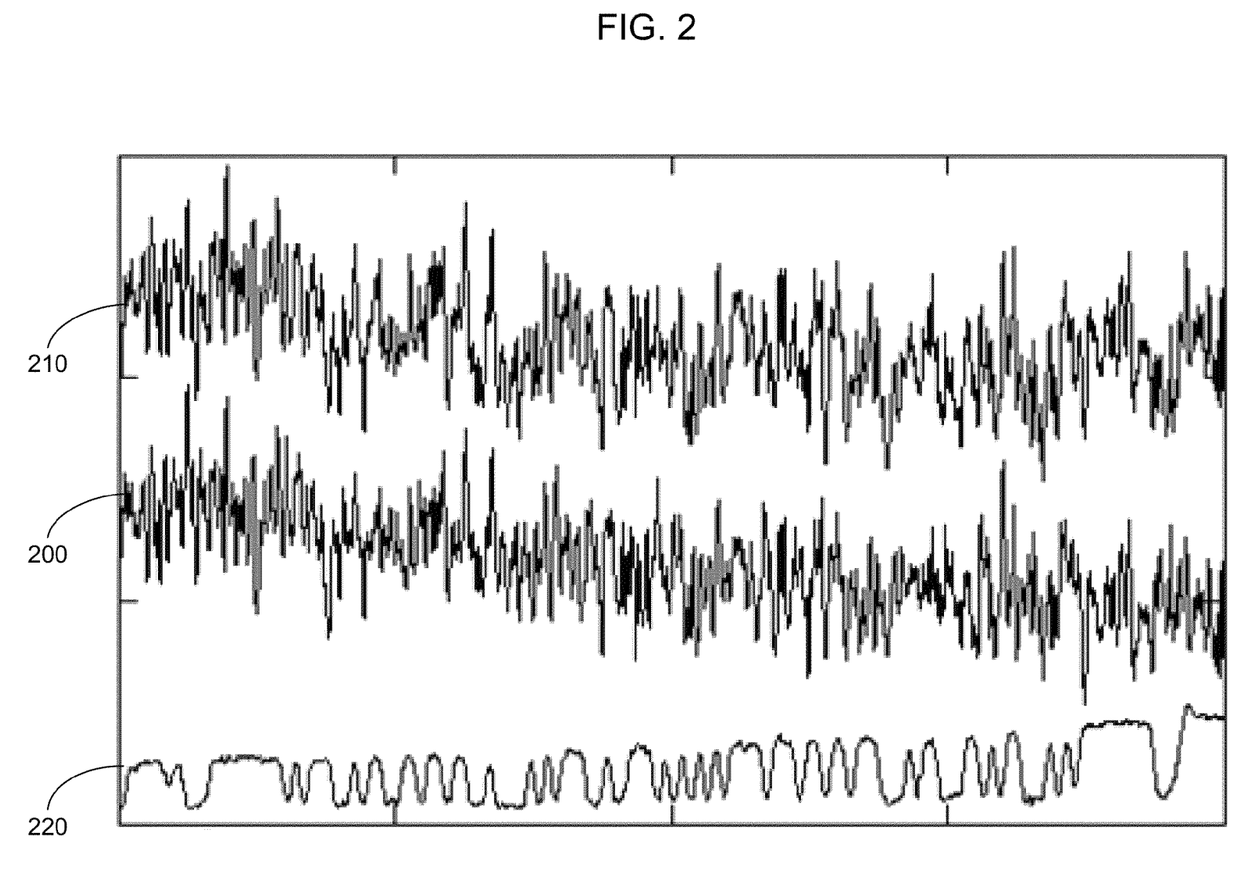
FIG. 2 is a graph of sample results of the method of FIG. 1 for compensating for FPN using dark image subtraction.

FIG. 2 is a graph of sample results of the method of FIG. 1 for compensating for FPN using dark image subtraction. The signals shown in FIG. 2 were acquired using a model RPLIS-2048 linear CMOS imager available from Panavision Imaging, LLC, Horner, N.Y. Signal 200 is a digitized representation of a signal corresponding to a dark linear image having an exposure time of 20 microseconds. Signal 210 is a digitized representation of a signal corresponding to an illuminated image of an optical code having an exposure time of 2 milliseconds. Signal 220 is a representation of a signal corresponding to a compensated image, where signal 200 has been subtracted from signal 210. The optical code information contained in signal 210 is obscured by noise; however, the optical code information is made clear by subtracting signal 200 from signal 210.

Figure 3:
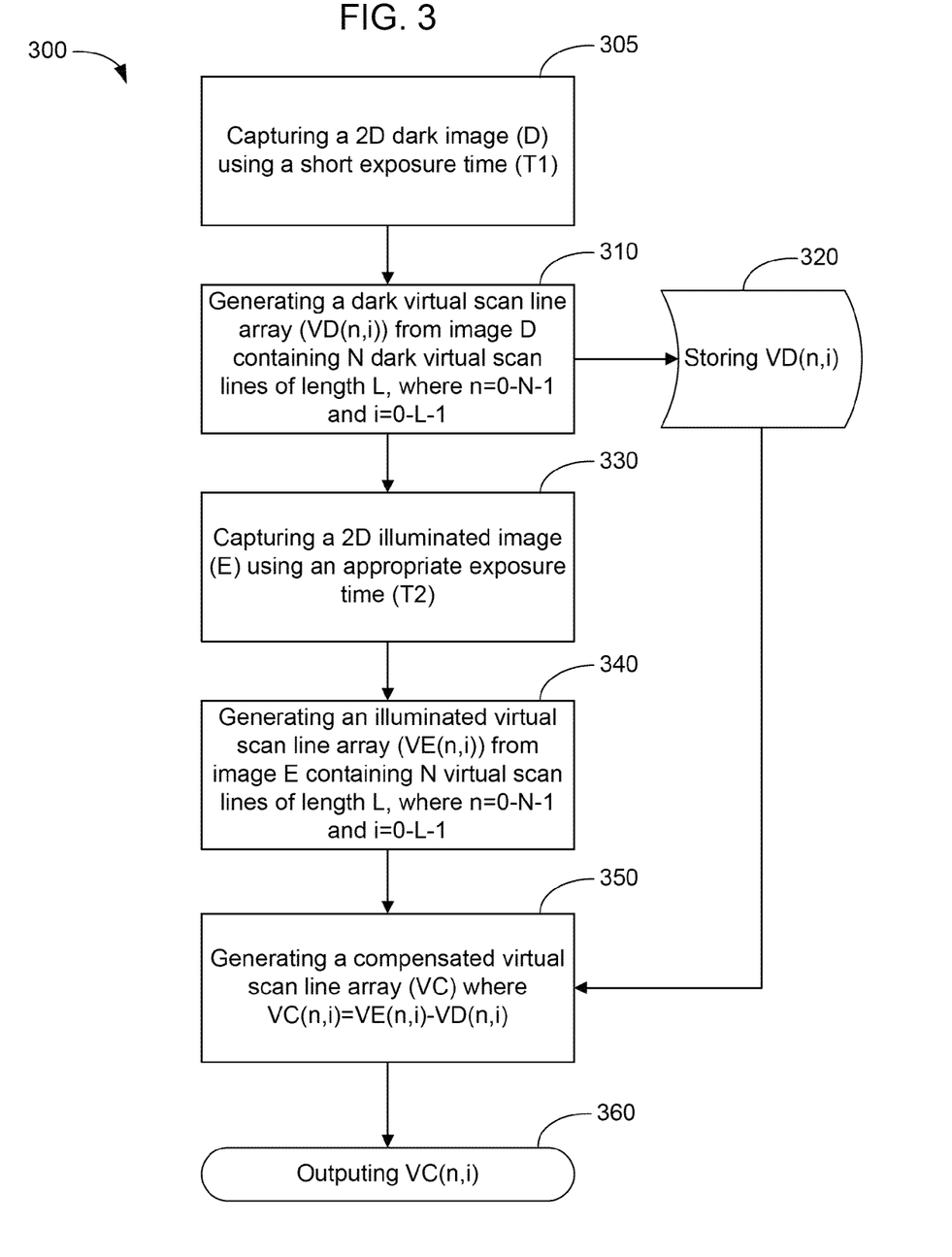
FIG. 3 is a flow chart of a method for compensating for FPN in a two dimensional image sensor utilizing virtual scan lines, according to one embodiment.

Another example of a method 300, according to the principles disclosed herein, is shown in FIG. 3. In the method 300, an array of virtual scan lines are utilized to compensate for FPN. The creation and use of virtual scan lines in optical code readers is described in U.S. Pat. No. 7,398,927, U.S. Publication No. 2008/0169347, and U.S. Publication No. 2006/0081712, which are incorporated herein by reference. A virtual scan line may be selected from a two dimensional image of an optical code symbol having information bearing characteristics in predominantly a single dimension. In some embodiments incorporating virtual scan lines, only a select portion of the data may be stored and processed. In other embodiments, pixels may be summed or averaged from a portion of the image to generate virtual scan lines to improve the signal-to-noise ratio of the resulting virtual scan lines. Pixel summing or averaging of an imaging array may be performed in a direction orthogonal to the virtual scan line direction, in order to increase the signal to noise ratio of the virtual scan line signal over what can be achieved with virtual scan lines created using a single image pixel for each virtual scan line pixel.

At step 305, a two dimensional dark image (D) is acquired using an area image sensor. At step 310, N dark virtual scan lines of length L are generated and a dark virtual scan line array (VD) is created. The location of a particular pixel within the dark virtual scan line array may be specified as VD(n,i), where n is a number between 0 and N−1, and i is a number between 0 and L−1. At step 320, VD(n,i) is stored. At step 330, a two dimensional illuminated image (E) is captured using an appropriate exposure time. At step 340, an illuminated virtual scan line array VE(n,i) containing N virtual scan lines is created from image E. At step 350, a compensated virtual scan line array (VC) is created, where VC(n,i)=VE(n,i)−VD(n,i). In certain embodiments, a single dark virtual scan line and a single illuminated virtual scan line may be used in place of the arrays of virtual scan lines shown in FIG. 3. At step 360, VC(n,i) is outputed for processing.

Utilizing virtual scan lines may reduce the computational load that would be required to capture, digitize, and store an entire dark image, and to subtract an entire dark image from an entire illuminated image. Thus, embodiments utilizing virtual scan lines may require fewer resources than would otherwise be required, and accordingly may be less expensive. The methods of compensating for FPN disclosed herein may be applied to full images, particularly in embodiments having sufficient computational power.

Figure 4:
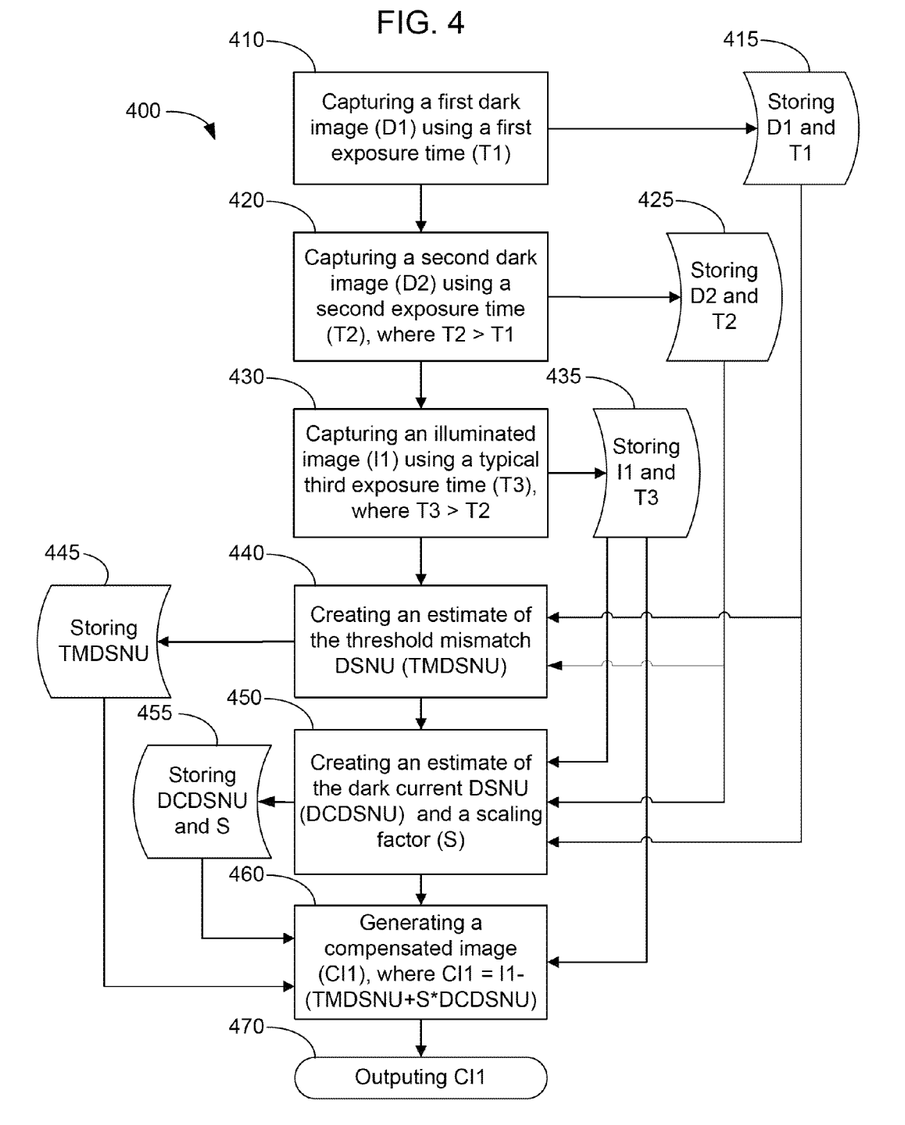
FIG. 4 is a flow chart of a method for compensating for FPN including both threshold mismatch dark signal non-uniformity and dark current dark signal non-uniformity.

Another example of a method 400, according to the principles disclosed herein, is shown in FIG. 4. The method 400 may be utilized to obtain an estimate of both threshold mismatch DSNU and dark current DSNU of a particular image sensor. At step 410, a first dark image (D1) is captured using a first exposure time (T1). D1 and T1 are stored at step 415. At step 420, a second dark image (D2) is captured using a second exposure time (T2), where T2 is greater than T1. At step 425, D2 and T2 are stored. At step 430, an illuminated image (I1) is captured using an exposure time (T3), where T3 is greater than T2. At step 435, I1 and T3 are stored.

In one preferred embodiment of method 400, T3 is between 300 and 700 times longer than T1, and T3 is between 100 and 300 times longer than T2. In yet a more preferred embodiment of method 400, T3 is approximately 512 times longer than T1, and T3 is approximately 256 times longer than T2.

At step 440, an estimate of threshold mismatch DSNU (TMDSNU) is created based on D1, T1, T2, and D2. The dark images D1 and D2 are composed of both TMDSNU and a dark current signal that is a product of the exposure time T1 or T2 and the dark current DSNU (DCDSNU), as shown in Eq. 1 and Eq. 2.

$$D1 = TMDSNU + DCDSNU*T1 \qquad \text{Eq. 1}$$

$$D2 = TMDSNU + DCDSNU*T2 \qquad \text{Eq. 2}$$

The threshold mismatch, may therefore be expressed according to Eq. 3.

$$TMDSNU = T2*\frac{D1}{T2-T1} - T1*\frac{D2}{T2-T1} \qquad \text{Eq. 3}$$

If T1 is much shorter than T2, then the calculation simplifies to TMDSNU=D1. At step 445, TMDSNU, is stored.

At step 450, an estimate of the dark current DSNU (DCDSNU) and a scaling factor may be created using D1, T1, D2, T2, and T3. As discussed above, dark current DSNU is a function of time and temperature. Accordingly, certain embodiments may also utilize a temperature measurement in estimating dark current DSNU. In one embodiment, subtracting D1 from D2 provides an estimate of DSNU due to dark current, because threshold mismatch DSNU is common to both measurements. D1 is subtracted from D2 to eliminate an estimate of the threshold mismatch DSNU and to retain the DCDSNU that accumulated from the period of time between T2 and T1. Accordingly, DCDSNU is equal to the difference between D2 and D1, as shown in Eq. 4.

$$DCDSNU = D2 - D1 \qquad \text{Eq. 4}$$

The time difference between T1 and T2 may then be compared to T3 in order to create a scaling factor, S, that may appropriately scale the estimate of dark current DSNU based on the exposure time T3. In certain embodiments, Eq. 5 expresses the relationship between T1, T2, T3, and S.

$$S = \frac{T3}{T2-T1} \qquad \text{Eq. 5}$$

The scaling factor S may then be multiplied by DCDSNU (the estimate of dark current DSNU obtained by subtracting D1 from D2, as shown in Eq. 4). At step 455, the estimate of the dark current DSNU and the scaling factor may be stored. At step 460, a compensated image CI1 may be generated, according to the relationship shown in Eq. 6, and C11 may be outputted at 470.

$$CI1 = I1 - (TMDSNU + S*DCDSNU) \qquad \text{Eq. 6}$$

In some embodiments, more than two dark images may be acquired, and mathematical modeling techniques may be utilized to refine the estimate of DCDSNU as a function of time. Such mathematical modeling techniques may include logarithmic, exponential, and polynomial curve fitting techniques or other suitable techniques.

A variety of systems are disclosed herein for compensating for FPN in an image sensor. In one system, the methods for compensating for FPN as described herein may be performed by a microprocessor in an optical code reader. In another system, the methods for compensating for FPN may be performed by a general purpose computer connected to an optical code reader utilizing a software program which implements the methods for compensating for FPN disclosed herein.

Figure 5:
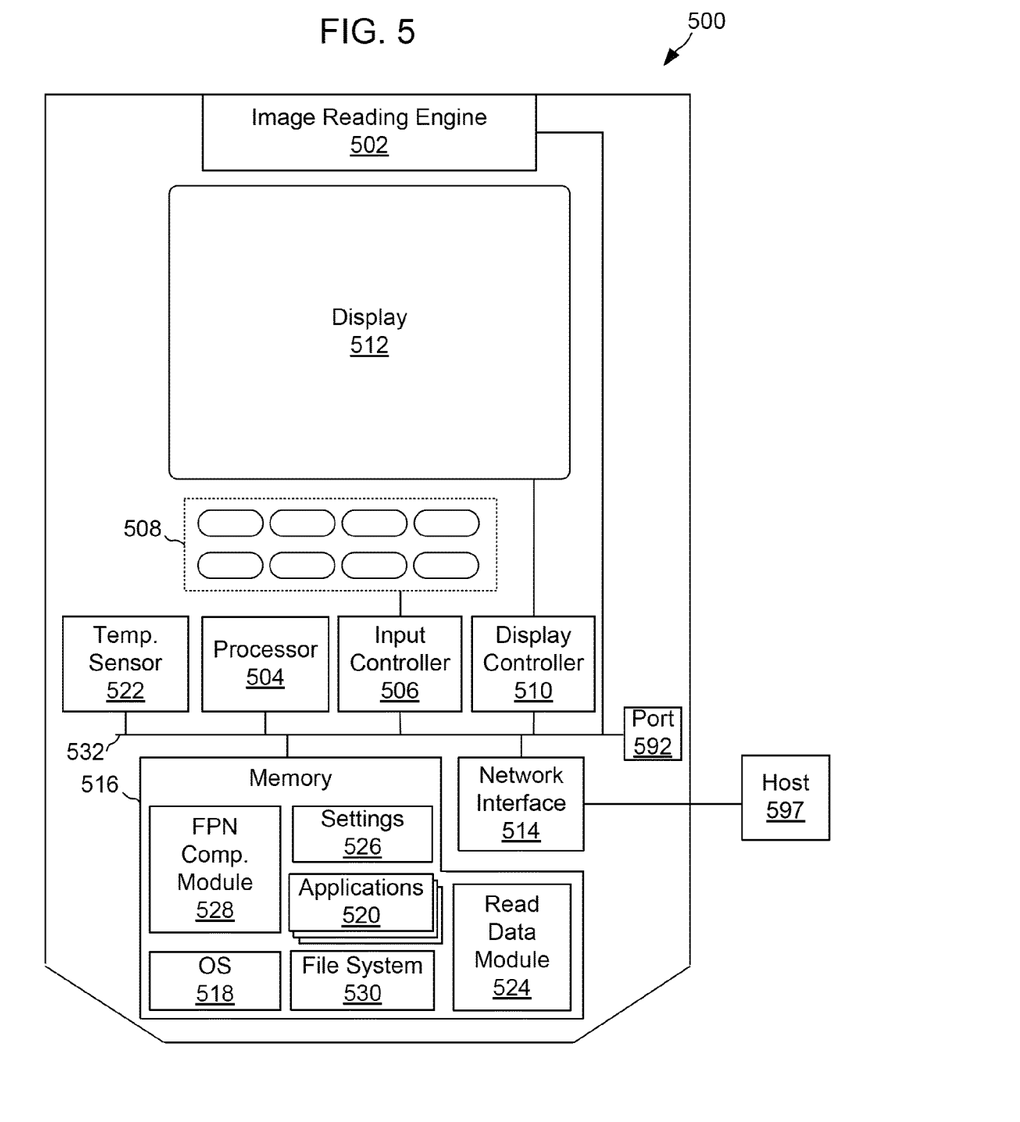
FIG. 5 is a block diagram of a portable data reader configured to estimate and to compensate for FPN.

FIG. 5 is a block diagram of one embodiment of an optical data reader 500, such as a barcode scanner. While a bus-based architecture, based on a bus 532, is illustrated in FIG. 5, other architectures are also suitable. For example, one or more of the components may be directly coupled to each other. The optical data reader 500 may incorporate an image reading engine 502 to read optically encoded symbols. Image reading engine 502 may encompass a CCD-based or CMOS-based imager.

The portable data reader 500 may further include a processor 504. The processor 504 may include any commercially available processor or other logic device capable of executing instructions, such as a general-purpose microprocessor, microcontroller, digital signal processor, application specific integrated circuit (ASIC), programmable logic array (PLA), field programmable gate array (FPGA), or the like. The processor 504 executes one or more programs to control the operation of other components of the portable data reader 500 (i.e., the transfer of data between the other components, the association of data from various components, the performance of calculations, and the presentation of results to the user). The processor 504 may, for example, be configured to perform the subtraction of a dark image from an illuminated image to generate an image that is, at least partially, compensated for fixed pattern noise.

Likewise, the portable data reader 500 may include an input controller 506 to receive user input from a keypad 508 or other input device, such as a pointing device, touch screen, microphone, temperature sensor, or other wired/wireless input devices. While various input devices may be integrated into the portable data reader 500 and coupled to the processor 504 via the input controller 506, input devices may also connect via other interfaces, such as a port 592. The port 592 may include one or more data interfaces, bus interfaces, wired or wireless network adapters, or modems for transmitting and receiving data. Accordingly, the input controller 506 may include one or more of hardware, software, and firmware to implement one or more protocols, such as stacked protocols along with corresponding layers. Thus, the port 592 may be embodied as one or more of a serial port (e.g., RS-232), a Universal Serial Bus (USB) port, an IEEE 1394 port, an IR interface, and the like. The input controller 506 may also support various wired, wireless, optical, and other communication standards.

A display controller 510 may drive a display 512. Display 512 may present data, menus, and prompts, and otherwise may be used to communicate with the user. Display 512 may be embodied as a transmissive or reflective liquid crystal display (LCD), cathode ray tube (CRT) display, touch screen, or other suitable display and/or input device.

The portable data reader 500 may also include a network interface 514 to communicate with an external network. Network interface 514 or port 592 may be utilized to communicate with one or more hosts 597 or other devices (e.g., a computer or a point-of-sale terminal). For example, data gathered by, or decoded by, the portable data reader 500 may be passed along to the host computer 597. The host computer 597 may present data, prompts, and otherwise communicate with the user via the display 512. For example, the computer may present decoded data to the user via the display 512, such as the object type (e.g., product type) corresponding to the scanned barcode and data associated with the object type (e.g., a price of the product). The data associated with the object type may be encoded in the barcode or accessed from a local or remote database based upon the object type. By way of another example, the host computer 597 may cause decoded data to be recorded on a tangible medium. For example, the host computer 597 may instruct a printer (not shown) to print the object type and data corresponding to the object type (e.g., print the product type and associated price on a receipt). The host computer 597 may be any machine that manipulates data according to a list of instructions (e.g., a point-of-sale terminal or any hardware/software used where a transaction takes place, such as a checkout counter in a shop). For example, the host computer 597 may comprise a mobile device, server, personal computer, or embedded computer. The network interface 514 may facilitate wired or wireless communication with other devices over a short distance (e.g., Bluetooth™) or long distances (e.g., the Internet). In the case of a wired connection, a data bus may be provided using any protocol, such as IEEE 802.3 (Ethernet), advanced technology attachment (ATA), personal computer memory card international association (PCMCIA), and USB. A wireless connection may use low or high powered electromagnetic waves to transmit data using any wireless protocol, such as Bluetooth™, IEEE 802.11a/b/g/n (or other WiFi standards), infrared data association (IrDa), and radiofrequency identification (RFID).

The portable data reader 500 further includes a memory 516, which may be implemented using one or more standard memory devices. The memory devices may include RAM, ROM, and/or EEPROM devices, and may also include magnetic and/or optical storage devices, such as hard disk drives, CD-ROM drives, DVD-ROM drives, etc.

The memory 516 may store various functional modules, settings, and user data. For instance, the memory 516 may include an operating system (OS) 518. Any suitable operating system 518 may be employed.

As illustrated, the memory 516 may further include an FPN compensation module 528. The FPN compensation module 528 may contain instructions executable on the processor 504 that allow the portable data reader to capture one or more dark images, which may be stored in a read data module 524. Further, the FPN compensation module 528 may contain instructions for creating an estimate of threshold mismatch dark signal non-uniformity and/or dark current dark signal non-uniformity. In various embodiments, the captured dark images may be linear or two dimensional. The FPN compensation module 528 may also contain instructions for subtracting the dark image, or the estimates of the threshold mismatch dark signal non-uniformity and the dark current dark signal non-uniformity, from an illuminated image. All of the foregoing may be stored within, or indexed by, a file system 530, which is typically managed by the OS 518. In various embodiments, the function performed by the FPN compensation module in conjunction with the processor 504 may be performed by an FPN estimation subsystem.

The memory 516 may also include various applications 520, which may be operable to perform a variety of functions in conjunction with the processor 504. One such application may include instructions executable on the processor 504 for generating virtual scan lines, as disclosed in U.S. Pat. No. 7,398,927, U.S. Publication No. 2008/0169347, and U.S. Publication No. 2006/0081712, which are already incorporated herein by reference. In various embodiments, the function performed by the application for generating virtual scan lines in conjunction with the processor 504 may be performed by a virtual scan line subsystem.

In one embodiment, the memory 516 may further store a number of settings 526 for the portable data reader 500. The settings 526 may include various symbology settings, device (e.g., user-interface) settings, and network settings.

Although the embodiment illustrated in FIG. 5 illustrates various software modules located in the memory 516, in other embodiments, the functions associated with the various software modules may be performed in other ways. For example, various subsystems may be employed that utilize application specific integrated circuits or other hardware implementations to perform the described functions. In another example, a combination of hardware and software is employed to perform the functionality of the various modules. While the illustrated embodiment depicts one possible configuration of a portable data reader 500, a wide variety of hardware and software configurations may be provided.

As described above, dark current DSNU may vary according to temperature. Accordingly, certain embodiments may also include a temperature sensor 522. Temperature sensor 522 may be utilized, for example, to detect changes in temperature, and based upon detected changes in temperature, to cause the portable data reader 500 to reacquire the dark image. In other embodiments, information from the temperature sensor 522 may be utilized in calculating an estimate of dark current DSNU.

It will be apparent to those having skill in the art that many changes may be made to the details of the above-described embodiments without departing from the underlying principles of the present disclosure.

What is claimed:

1. A method of compensating for fixed pattern noise in an image sensor of an optical data reader, the method comprising:

capturing a dark image using the image sensor, the dark image comprising a negligible amount of scene information to thereby provide an estimate of fixed pattern noise in the image sensor, the dark image having a corresponding first exposure time;

storing the dark image;

capturing an illuminated image comprising optical data from a read area using the image sensor, the illuminated image having a corresponding second exposure time, wherein the second exposure time exceeds the first exposure time;

subtracting the dark image from the illuminated image to generate a compensated image comprising optical data that is, at least partially, compensated for fixed pattern noise in the image sensor;

during normal operation of the optical data reader, detecting a change in a condition that affects the fixed pattern noise;

based upon detecting the change in the condition, capturing a new dark image and replacing the dark image with the new dark image; and subtracting the new dark image from a subsequently captured illuminated image to generate a subsequent compensated image.

2. The method of claim 1, wherein the second exposure time is between 100 and 1,000 times longer than the first exposure time.

3. The method of claim 1, wherein the second exposure time is between 200 and 300 times longer than the first exposure time.

4. The method of claim 1, wherein the first exposure time is between 1 microsecond and 1,000 microseconds.

5. The method of claim 1, wherein the first exposure time is between 5 microsecond and 30 microseconds.

6. The method of claim 1, wherein the optical data reader comprises an optical code reader and wherein capturing the dark image and storing the dark image are performed each time the optical code reader is activated.

7. The method of claim 1, wherein subtracting the dark image from the illuminated image occurs prior to acquisition of a subsequent illuminated image.

8. The method of claim 1, further comprising:
capturing a plurality of illuminated images, the plurality of illuminated images having a corresponding plurality of different exposure times;
subtracting the dark image from each of the plurality of illuminated images to generate a plurality of images, at least partially, compensated for fixed pattern noise.

9. The method of claim 1, further comprising:
capturing a plurality of preliminary dark images using the image sensor; and
averaging the plurality of preliminary dark images in order to generate the dark image.

10. The method of claim 1, wherein
the condition for which a change is detected is one of temperature, voltage, exposure time, and lighting.

11. An optical data reader, comprising:
an image sensor to capture a dark image comprising a negligible amount of scene information to thereby provide an estimate of fixed pattern noise in the image sensor, the dark image having a corresponding first exposure time, and to capture an illuminated image comprising optical data from a read area, the illuminated image having a corresponding second exposure time, and wherein the second exposure time exceeds the first exposure time;
a non-transitory computer-readable storage medium to store the dark image; and
a fixed pattern noise compensation subsystem to subtract the dark image from the illuminated image to generate a compensated image comprising optical data that is, at least partially, compensated for fixed pattern noise in the image sensor, wherein during normal operation the fixed pattern noise compensation subsystem detects a change in a condition that affects the fixed pattern noise in the image sensor and, based upon detecting the change in the condition, directs the image sensor to capture a new dark image and replaces the dark image with the new dark image in the non-transitory computer-readable storage medium, wherein the new dark image is subtracted from a subsequent illuminated image to generate a subsequent compensated image.

12. The optical data reader of claim 11, wherein the fixed pattern noise compensation subsystem comprises a processor; and
wherein the computer-readable storage medium further stores a fixed pattern noise compensation module executable on the processor.

13. The optical data reader of claim 11, further comprising:
a temperature sensor to detect a change of temperature of the image sensor, wherein the condition for which the change is detected is temperature, and wherein, based upon a detection of a change of temperature measured by the temperature sensor, the image sensor recaptures the dark image.

14. The optical data reader of claim 11, wherein the image sensor comprises a linear CMOS imager.

15. The optical data reader of claim 11, wherein the image sensor comprises a two dimensional CMOS imager, and wherein the optical data reader further comprises:
a virtual scan line generation subsystem to generate a virtual scan line array from a two dimensional image of an optical code symbol; and
wherein at least one of the dark image and the illuminated image comprise a virtual scan line array.

16. The optical data reader of claim 11, wherein the optical data reader reads at least one of a barcode, a signature, a fingerprint, a handprint.

17. A method of compensating for fixed pattern noise in an image sensor of an optical data reader, the method comprising:
capturing a two dimensional dark image using the image sensor, the dark image comprising a negligible amount of scene information to thereby provide an estimate of fixed pattern noise in the image sensor, the dark image having a corresponding first exposure time;
storing a portion of the two dimensional dark image along a pattern of virtual scan lines to produce a dark virtual scan line array;
capturing a two dimensional illuminated image comprising optical data from a read area, the illuminated image having a corresponding second exposure time;
generating from the two dimensional illuminated image an illuminated virtual scan line array along a pattern of virtual scan lines;
subtracting the dark virtual scan line array from the illuminated virtual scan line array to generate a two dimensional compensated image comprising optical data that is, at least partially, compensated for fixed pattern noise in the image sensor;
during normal operation of the optical data reader, detecting a change in a condition that affects the fixed pattern noise in the image sensor;
based upon detecting the change in the condition, capturing a new dark image and replacing the dark image with the new dark image in the pattern of virtual scan lines to produce a new dark virtual scan line array; and
subtracting the new dark virtual scan line array from a subsequently generated illuminated virtual scan line array to generate a subsequent compensated image.

18. A method of compensating for fixed pattern noise in an image sensor in an optical data reader, wherein the fixed pattern noise comprises threshold mismatch dark signal non-uniformity and dark current dark signal non-uniformity, the method comprising:
capturing a first dark image using the image sensor, the first dark image comprising a negligible amount of scene information, the first dark image having a first exposure time;
capturing a second dark image, the second dark image having a second exposure time, and wherein the second exposure time is longer than the first exposure time;
capturing an illuminated image comprising optical data from a read area using the image sensor, the illuminated image having a third exposure time;
creating an estimate of threshold mismatch dark signal non-uniformity using the first dark image;
creating an estimate of dark current dark signal non-uniformity by subtracting the first dark image from the second dark image;
creating a scaled estimate of the dark current dark signal non-uniformity by multiplying the estimate of the dark current dark signal non-uniformity by a scaling factor based on the first exposure time, the second exposure time, and the third exposure time; and
subtracting the estimate of the threshold mismatch dark signal non-uniformity and the scaled estimate of the dark current dark signal non-uniformity from the illuminated image to generate a compensated image that is, at least partially, compensated for fixed pattern noise in the image sensor.

19. The method of claim 18, wherein the third exposure time is between 300 and 700 times longer than the first exposure time.

20. The method of claim 18, wherein the third exposure time is between 100 and 300 times longer than the second exposure time.

21. The method of claim 18, wherein the scaling factor comprises a ratio of the third exposure time and the difference between the second exposure time and first exposure time.

* * * * *